Figure 1:
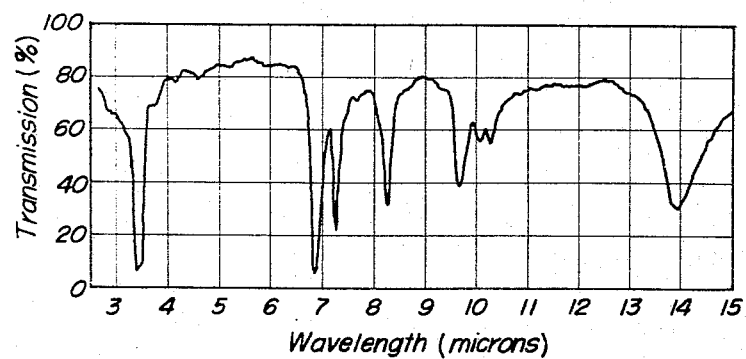

I. R. Spectrum of $SbAl(C_2H_5)_4Cl_4$ $SbAl(C_2H_5)_6Cl_2 / TiCl_3$ mole ratis

United States Patent Office 3,330,816
Patented July 11, 1967

3,330,816
METHOD FOR THE PRODUCTION OF
α-OLEFIN POLYMERS
Yukichi Takashi and Itsuho Aishima, Nobeoka-shi, and Yuji Kobayashi and Yoshio Tsunoda, Tokyo, Japan, assignors to Asahi Kasei Kogyo Kabushiki Kaisha, Osaka, Japan, a corporation of Japan
Filed Sept. 20, 1962, Ser. No. 224,962
5 Claims. (Cl. 260—93.7)

The present invention relates to a process for producing high crystalline polymers by using novel catalysts.

It is one of the objects of the present invention to provide novel catalysts for the production of α-olefin polymers abundant in the structure of high steric regularity.

It is another object of the present invention to provide a polymerizing process for the production of α-olefin polymers abundant in the structure of high steric regularity by using said novel catalysts.

Another object of the present invention is to provide poly-α-olefins having structure of high steric regularity which is available as is for the direct production of high quality fiber, film and molded articles without any treatment such as extraction or fractional dissolution of the polymerization products.

As a process for producing crystalline polymers from α-olefins, Giulio Natta et al. disclosed a method in Japanese patent No. 10,596/57. Therein is shown a process for producing linear α-olefin polymers of specific steric structure in the presence a catalyst prepared by the reaction of a compound of one of the metals belonging to IV-A, V-A and VI-A groups of the Periodic Table (including thorium and uranium) with a metal or its alloy belonging to groups II or III of the Periodic Table or a metal hydride or organo-metallic compound of metals belonging to groups I, II and III of the Periodic Table. Subsequently, in Japanese patent No. 2,489/59, the patentees disclosed that, in the application of said catalysts for α-olefin polymerization, they found a process for producing stereospecific and highly crystalline polymers, that is, high molecular isotactic polymers, in the presence of a solid and insoluble catalyst, such as a catalyst consisting of aluminum triethyl and titanium trichloride.

This latter invention is a significant improvement over the invention described in Japanese patent No. 10,596/57. However, in the polymerization of α-olefins, for example, propylene, according to the latter process, the proportion of isotactic polymer which corresponds to the proportion of the n-heptane extraction residue is less than 80% (see Japanese patent application No. 2,489/59). Therefore the polymerization product contains a considerable amount of non-crystalline polymer (such as atactic and stereoblock polymer) which are considered to have the structure of steric irregularity. Fibers produced from polymers having such degree of the portion of the isotactic polymer have a waxy feel as mentioned by the inventors themselves in Japanese patent application No. 4,722/60, which is a great obstacle to its utilization. For overcoming this fault, Natta et al. state in Japanese patent application No. 4,895/60 that the polymer thus obtained was extracted with an organic solvent, for example, 2-ethyl hexane to remove non-crystalline atactic polymers, so that excellent fiber, film and the like could be prepared. It has been found that such a deficiency can be overcome by producing poly-α-olefins according to the process of the present invention.

That is, the present invention is directed to the manufacture of poly-α-olefin having a high stereospecificity which comprises polymerizing α-olefin by employing a catalyst obtained by the reaction between titanium trichloride, an organo-aluminum compound and an organometallic complex(es) containing antimony and aluminum represented by the general formulas, $SbAlR_mX_n$ ($m+n=8$) and $SbAlR_{m'}·X_{n'}$ ($m'+n'=6$), $Sb_2AlR_{m''}·X_{n''}$ ($m''+n''=9$) and $SbAl_2R_{m'''}·X_{n'''}$ ($m'''+n'''=11$). The polymerization method comprises contacting monomeric α-olefin, for example propylene, which may be polymerized to the polymer having a stereoregular structure with the said catalyst obtained by the reaction between titanium trichloride, an organo-aluminum compound and said organometallic complex in a molar ratio of 1:1–6:0.005–1 in an inert vehicle, preferably at a lower temperature and under a lower pressure than conventionally employed.

The catalysts, according to the present invention, have surprising characteristics in the preparation of the polymer products, which are rich in the high crystalline polymers of isotactic structure, from α-olefins. For example, in the polymerization of propylene, one of the typical conventional catalysts consisting of aluminum triethyl and titanium trichloride produces polymers having only 70% of isotacticity (which is indicated by the proportion of the residue to the original substances after boiling n-heptane extraction for 24 hours using Soxhlet's extractor and will be indicated as the residue of n-heptane extraction in the following), while polypropylene of 86% to 92% isotacticity and moreover 98% in a particular case can be produced by using the novel catalysts of the present invention.

Furthermore, the catalysts according to the present invention are very active and show a polymerization rate several times higher than that of the conventional Ziegler-Natta catalyst (Japanese patent application No. 2,489/59) which consists of aluminum triethyl and $TiCl_3$. As will be explained later, the polymers obtained with the catalyst of the invention have a sufficiently high molecular weight for preparing excellent quality film or molded articles and the intrinsic viscosity (reduced viscosity of 0.1% tetralin solution at 135° C.) of 2 to 5 in accordance with the conditions of polymerization.

Thus, the present invention is characterized in that, in the polymerization of α-olefins such as propylene according to the process of the present invention, the polymerization products are available as is for preparing sufficiently good products such as fiber, film or molded articles which give very little waxy feel. Such specific catalysts are formed by the mutual reaction of the catalyst components, titanium trichloride, organic aluminum compound and organo-metallic complex containing antimony and aluminum.

As Natta has already pointed out (Angew. Chem., vol. 69, pp. 213 (1957), no substantial reaction takes place between titanium trichloride and an organic aluminum compound. On the other hand the presence of said organo-metallic complex containing antimony and aluminum causes marked mutual reactions between these catalyst components. This is established by the fact that the reaction mixture generates a large amount of gas and blackens gradually as the reaction proceeds.

The present invention is described below according to a process wherein aluminum triethyl is used as the organic aluminum compound, titanium trichloride is prepared by reducing titanium tetrachloride with hydrogen at high temperatures and $SbAl(C_2H_5)_4Cl_4$ having the general formula, $SbAlR_mX_n$ ($m+n=8$), is employed as the complex containing antimony and aluminum.

$SbAl(C_2H_5)_4Cl_4$ is a white powdery crystal (melting point; 182–185° C.) which is prepared by the reaction between $SbCl_3$ and $Al(C_2H_5)_3$ or $Al(C_2H_5)_2Cl$ or by other methods and is a substantially insoluble complex in aliphatic saturated hydrocarbons such as n-hexane.

The detailed explanation of this synthesizing process is as follows. In a reaction vessel of 1000 ml. capacity equipped with a mercury sealed stirrer, dropping funnel, and refluxing condenser all made of glass, 0.5 mole of antimony trichloride (SbCl)$_3$ and 400 ml. of n-hexane, an inactive hydocarbon solvent dried with sodium as reaction medium are charged, the contents being kept at 70° C., and then 1 mole of aluminum triethyl $$[Al(C_2H_5)_3]$$

is dropped slowly under oxygen-free nitrogen atmosphere. A sudden exothermic reaction takes place upon the dropping of the Al(C$_2$H$_5$)$_3$, to precipitate black solid antimony and divide the liquid phase into two layers. After the addition of a definite amount of Al(C$_2$H$_5$)$_3$ is finished, stirring is continued for 1 hour at the same temperature and then the liquid is settled for 4 hours. By removing the black precipitate through decantation and filtration, two colorless transparent liquid phases are obtained. The upper layer contains organic aluminum compounds soluble in hexane mainly, while the lower layer contains the objective complex which is substantially insoluble in n-hexane. After the upper layer is removed by syphon, the lower layer is extracted 10 times by shaking with n-hexane for more than 10 minutes, each time to remove the portion soluble in hexane, so that a colorless or light yellow crystal is separated.

Furthermore, said product is extracted in n-hexane for ten hours using an Asahina continuous extractor, to remove the portion soluble in hexane. Then, this crystal is dried in a vacuum, to remove the residual hexane, so, consequently, 60.5 g. of crystalline organo-metallic complex is recovered. The analytical results of thus obtained crystal is shown below.

| Element | Sb | Al | Cl | C | H |
|---|---|---|---|---|---|
| Observed value (percent) | 29.8 | 6.6 | 34.8 | 23.4 | 5.1 (as C$_2$H$_5$) |
| Atomic ratio | 1.0 | 1.0 | 4.02 | 4.03 | |
| Calculated value (percent) for— (C$_2$H$_5$)$_4$SbAlCl$_4$ | 29.9 | 6.6 | 34.9 | 23.6 | 5.0 |

NOTE.—Following analytical method was adapted. After decomposing of a part of the sample with aqueous solution of potassium permanganate and sulfuric acid, Sb was analyzed quantitatively by using KMnO$_4$-titration method, and Al was analyzed by using oxine method. Another part of the sample was decomposed with water and chlorine content was analyzed by using Vorhard's method. Finally, carbon and hydrogen were quantitatively analyzed by using ordinary micro-combustion method.

The analytical results show that the product thus obtained is a complex of SbAl(C$_2$H$_5$)$_4$Cl$_4$. Its melting point was measured by known method and found to be from 182° C. to 185° C. and its infrared absorption spectrum is shown in FIG. 1.

0.004 weight part SbAl(C$_2$H$_5$)$_4$Cl$_4$ thus obtained, 0.04 weight part TiCl$_3$ and 0.06 weight part Al(C$_2$H$_5$)$_3$ are supplied into a polymerization vessel equipped with a stirrer, being fed with 60 parts by weight purified n-hexane which corresponds to ½ of the effective capacity of the vessel, and after preparing the catalyst by mixing and reacting each of the catalyst components at 60° C., purified propylene is charged so as to keep the pressure at 3 kg./cm.$^2$ for 2 hours at 60° C. while being stirred. The polymerization proceeded rapidly.

After the lapse of a definite time, the polymerization vessel is cooled, the unreacted propylene is removed and the residual catalyst is decomposed by adding methanol to the polymerization product. The polymer thus obtained after filtration is washed with methanol and dried to prepare 34 weight parts of white solid polymer. The product obtained is white and fine powdery polymer whose residue of n-hexane extraction reaches 92.5% and intrinsic viscosity ($\eta$sp./c. of 0.1% tetralin solution at 135° C.) is 4.02.

In this polymerization example, the polymerization rate reaches a high value of 166 as indicated by the ratio of the weight of polymer obtained per hour to the unit weight of all the catalyst used.

The polymer thus obtained is applied to melt spinning and has excellent extrudability.

Thus obtained filament or staple fiber and textile thereof have sufficiently satisfactory touch without any waxy feeling, which is one of the greatest faults of polypropylene fiber.

As described above, the complexes of organo-metallic complexes containing aluminum and antimony in the present invention have the general formulas, such as $$SbAlR_mX_n \ (m+n=8), \ SbAlR_{m'}X_{n'} \ (m'+n'=6)$$
$$Sb_2AlR_{m''}X_{n''} \ (m''+n''=9)$$

and $$SbAl_2R_{m'''}X_{n'''} \ (m'''+n'''=11)$$

where R is the same or different alkyl radicals which have 1 to 8 carbon atoms and X consists of one or two members selected from the group consisting of Br, Cl and I, and $m$, $n$, $m'$, $n'$, $m''$, $n''$, $m'''$ and $n'''$ are all positive integers.

TABLE 1

| General Formula | $m$ | $n$ | Preparation Method | Appearance of the complex | Solubility | |
|---|---|---|---|---|---|---|
| | | | | | n-Hexane | Benzene |
| SbAlR$_m$X$_n$ $m+n=8$ | 4 | 4 | SbCl$_3$+Al(C$_2$H$_5$)$_2$Cl (excess)→SbAl(C$_2$H$_5$)$_4$Cl$_4$ | White crystal, M.P. 182–185° C. | Nearly insoluble. | Slightly soluble. |
| | 5 | 3 | Sb(C$_2$H$_5$)$_4$Cl+Al(C$_2$H$_5$)$_2$Cl$_2$→SbAl(C$_2$H$_5$)$_5$Cl$_3$ | White crystal, M.P. about 35° C. | do | Do. |
| | 6 | 2 | Sb(C$_2$H$_5$)$_4$Cl+Al(C$_2$H$_5$)$_2$Cl→SbAl(C$_2$H$_5$)$_6$Cl$_2$ | Colorless liquid | do | Do. |
| | 6 | 2 | Sb(C$_3$H$_7$)$_4$Br+Al(C$_2$H$_5$)$_2$Cl→SbAl(C$_2$H$_5$)$_2$(C$_3$H$_7$)$_4$ClBr | do | do | Do. |
| | 7 | 1 | Sb(CH$_3$)$_4$I+Al(C$_2$H$_5$)$_3$→SbAl(CH$_3$)$_4$(C$_2$H$_5$)$_3$I | do | do | Do. |
| | 7 | 1 | Sb(C$_2$H$_5$)$_4$I+Al(C$_2$H$_5$)$_3$→SbAl(C$_2$H$_5$)$_7$I | do | do | Do. |
| | 7 | 1 | Sb(C$_4$H$_9$)$_3$(C$_2$H$_5$)Cl+Al(C$_3$H$_7$)$_3$→SbAl(C$_4$H$_9$)$_3$(C$_3$H$_7$)$_3$(C$_2$H$_5$)Cl | do | do | Do. |
| SbAlR$_{m'}$X$_{n'}$ $m'+n'=6$ | 4 | 2 | Sb(C$_2$H$_5$)$_3$+Al(C$_2$H$_5$)Cl$_2$→SbAl(C$_2$H$_5$)$_4$Cl$_2$ | Orange liquid | do | |
| | 3 | 3 | Sb(C$_2$H$_5$)$_3$+AlCl$_3$→SbAl(C$_2$H$_5$)$_3$Cl$_3$ | Green brown liquid | do | |
| Sb$_2$AlR$_{m''}$X$_{n''}$ $m''+n''=9$ | 5 | 4 | Sb(C$_2$H$_5$)$_3$ (excess)+AlCl$_3$→Sb$_2$Al(C$_2$H$_5$)$_5$Cl$_4$ | Light greenish brown crystal, M.P. 160° C. | do | Insoluble. |
| | 5 | 4 | Sb(C$_3$H$_7$)$_3$ (excess)+AlCl$_3$→Sb$_2$Al(C$_3$H$_7$)$_5$Cl$_4$ | do | do | Do. |
| SbAl$_2$R$_{m'''}$X$_{n'''}$ $m'''+n'''=11$ | 9 | 2 | SbCl$_3$+Al(C$_2$H$_5$)$_3$ (excess)→SbAl$_2$(C$_2$H$_5$)$_9$Cl$_2$ | Colorless liquid | do | Slightly soluble. |
| | 10 | 1 | Sb(C$_2$H$_5$)$_4$Cl+2Al(C$_2$H$_5$)$_3$→SbAl$_2$(C$_2$H$_5$)$_{10}$Cl | do | do | Do. |
| | 10 | 1 | Sb(C$_2$H$_5$)$_4$Cl+Al(i-C$_6$H$_{13}$)$_3$+Al(C$_2$H$_5$)$_3$→SbAl$_2$(C$_2$H$_5$)$_7$(i-C$_6$H$_{13}$)$_3$Cl | do | Slightly soluble. | Do. |

Said complexes can be synthesized by not only a similar method to that mentioned above, but also by other different methods. Methods available for almost stoichiometric synthesis are as shown in Table 1. The common characteristics of these complexes of organometallic compound are to be insoluble in such lower saturated aliphatic hydrocarbons as n-hexane.

Among these series of synthesizing methods, an example for preparing $SbAl(C_2H_5)_5Cl_3$ is explained in detail below.

13.7 g. (0.05 mole) of $Sb(C_2H_5)_4Cl$ crystal and 10 cc. n-hexane are charged into a 100 cc. four necked round flask under nitrogen atmosphere. Maintaining the inner temperature of the flask at $-50°$ C., 6.35 g. (0.05 mole) of $Al(C_2H_5)Cl_2$ dissolved in 40 cc. n-hexane are added. After addition is finished, the flask is gradually heated to 50° C. and stirring is continued for about 30 minutes to carry out the reaction completely. Then, the product was washed repeatedly with n-hexane. After, n-hexane was distilled off, 20 g. of colorless crystal (M.P. 34 to 36° C.) are isolated. The analytical result correspond with the chemical formula, $SbAl(C_2H_5)_5Cl_3$. The analytical results are as follows. Found percent: Sb, 29.69; Al, 6.59; Cl 26.90; C, 28.49; H, 5.96. Calculated percent: Sb, 30.41; Al, 6.74; Cl, 26.57; C, 29.97; H, 6.29. Other complexes are prepared by generally similar methods at sufficient yield.

The following organo-metallic complexes containing antimony and aluminum are suitable in the present invention:

$SbAl(C_2H_5)_7Cl$, $SbAl(CH_3)_4(C_2H_5)_3I$
$SbAl(C_4H_9)_3(C_3H_7)_3(C_2H_5)Cl$, $SbAl(C_2H_5)_6Cl_2$
$SbAl(C_2H_5)_2(C_3H_7)_4ClBr$, $SbAl(C_2H_5)_5Cl_3$
$SbAl(C_2H_5)_4Cl_4$, $SbAl(C_2H_5)_3Cl_5$, $SbAl(C_2H_5)_3Cl_3$
$SbAl(C_2H_5)_4Cl_2$, $Sb_2Al(C_2H_5)_5Cl_4$, $Sb_2Al(C_3H_7)_5Cl_4$
$SbAl_2(C_2H_5)_9Cl_2$, $SbAl_2(C_2H_5)_{10}Cl$
$SbAl_2(C_2H_5)_7(C_6H_{13})_3Cl$

The organic aluminum compounds suitable in the present invention have the general formula, RR'AlR'' (wherein R and R' are the same or different alkyl radicals and R'' is an alkyl radical or halogen) and, for example, $Al(C_2H_5)_3$, $Al(C_3H_7)_3$, $Al(C_4H_9)_3$ and $Al(C_2H_5)_2Cl$ are especially effective.

As titanium trichloride suitable in the present invention, both titanium trichloride prepared by reducing titanium tetrachloride with hydrogen at a high temperature and titanium trichloride (including $AlCl_3$ as mixed crystal) prepared by reducing titanium tetrachloride with aluminum can be used.

The α-olefins suitable in the present invention contain 3 to 8 carbon atoms and, for example, are propylene, butene-1, pentene-1, 3-methyl butene-1, 4-methyl pentene-1, styrene and the like.

It is desirable that α-olefin monomer of the highest purity is used, but α-olefin gas of relatively low purity i.e. about 80% including an inert gas is also suitable.

In the performance of the present invention, it is desirable that 0.0001 to 0.05 mole of titanium trichloride be used for 1 mole of α-olefin to be polymerized. It is also desirable to use a catalyst prepared by the reaction among said titanium trichloride, organic aluminum compound and organo-metallic complex containing antimony and aluminum in the molar ratio of 1:1–6:0.005.

The polymerization is retarded or inhibited by increasing the addition of organo-metallic complex containing antimony and aluminum, so more than 1 mole of organo-metallic complex containing antimony and aluminum should not be used against 1 mole of titanium trichloride. However, if the addition of said complex is less than 0.005 mole against 1 mole of titanium trichloride, any variation in the addition of organic aluminum compound can not accelerate the polymerization, or improve the crystallinity, either.

To show the effect of the added amount of the organo-metallic complex including antimony and aluminum to the polymerization, the results of polymerization are set forth in Table 2, wherein propylene was polymerized by use of a catalyst prepared from 0.0025 mole of titanium trichloride, 0.010 mole or 0.005 mole of tri-ethyl aluminum and a varying amount of $SbAl(C_2H_5)_3Cl_3$, in the same experimental conditions as shown in Example 13.

TABLE 2

| Run No. | $\dfrac{Al(C_2H_5)_3}{TiCl_3}$ (mole ratio) | $\dfrac{SbAl(C_2H_5)_3Cl_3}{TiCl_3}$ (mole ratio) | Standard polymerization rate $(\bar{v}_s)$ (g./g. $TiCl_3$·hr.) | Polymerization yield (percent) | Insoluble in boiling n-heptane (percent) | $[\eta]$ (g./100 cc.)$^{-1}$ |
|---|---|---|---|---|---|---|
| 1 | 4 |  | 30 | 95 | 76.5 | 2.87 |
| 2 | 2 | 0.03 | 36 | 98 | 92.7 | 3.48 |
| 3 | 2 | 0.07 | 117 | 98 | 89.0 | 3.87 |
| 4 | 2 | 0.10 | 131 | 97 | 89.7 | 3.83 |
| 5 | 2 | 0.30 | 181 | 95 | 91.4 | 3.44 |
| 6 | 4 | 0.004 | 21 | 82.5 | 80.9 | 2.91 |
| 7 | 4 | 0.01 | 25 | 99 | 85 | 3.41 |
| 8 | 4 | 0.03 | 40 | 97 | 86.2 | 3.73 |
| 9 | 4 | 0.07 | 89 | 99.5 | 89.6 | 3.61 |
| 10 | 4 | 0.30 | 185 | 99 | 90.7 | 2.92 |
| 11 | 4 | 1.0 | 167 | 97 | 88.2 | 3.22 |
| 12 | 4 | 1.5 |  | 74 | 96.4 | 5.03 |

NOTE.—The standard polymerization rate $(\bar{v}_s)$ was calculated as follows.

Readings of the pressure gauge attached to the reaction vessel are plotted against polymerization time and the weight (g.) of the yielded polymer per hour for 1 g. of $TiCl_3$ is calculated. The value is converted into the value which is expected when partial pressure of propylene is kept constant at 3 kg./cm.$^2$, by using the following equation.

$$\bar{v}_s = \frac{\overline{m}_{P_s}}{G_{TiCl_3}} \cdot \frac{-dl_n P_m}{dt}$$

wherein, $\overline{m}$: Amount of polymer in gram produced when partial pressure of monomer reduces by 1 kg./cm.$^2$.
$G_{TiCl_3}$: Weight (g.) of $TiCl_3$ used.
$P_m$: Monomer partial pressure (kg./cm.$^2$)
$t$: Time (hr.)
$P_s$: Standard monomer partial pressure (3 kg./cm.$^2$).

The polymerization rate by using the catalyst of the present invention may vary with the ratio of each catalyst component. There is shown a remarkable effect on the polymerization rate in the use of an organo-metallic complex containing antimony and aluminum in the proportion of 0.005 to 1.0 mole against 1.0 mole of titanium trichloride and in case of employing $SbAl(C_2H_5)_3Cl_3$ as an example of organo-metallic complexes containing antimony and aluminum a certain max. point is found according to the amount of this complex, as shown in Table 2. The maximum point of the polymerization rate varies simultaneously with the amount of organic aluminum compound used.

Figure 2:
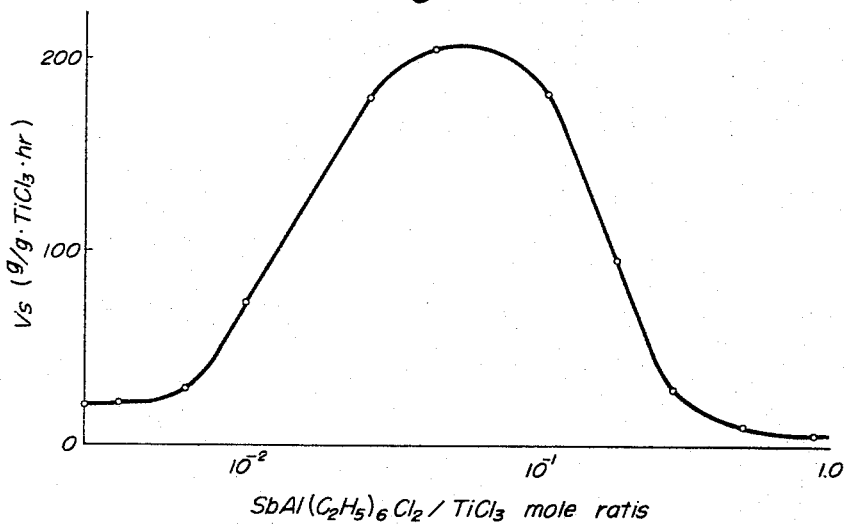

In the above example, when the molar ratio of Al(C$_2$H$_5$)$_3$/TiCl$_3$ is 2, the maximum polymerization rate is obtained for a molar ratio of 0.1 to 0.3 of SbAl(C$_2$H$_5$)$_3$Cl$_3$/TiCl$_3$ and when Al(C$_2$H$_5$)$_3$/TiCl$_3$ is 4, the maximum polymerization rate is found for a molar ratio of 0.1 to 1.0 of SbAl(C$_2$H$_5$)$_3$Cl$_3$/TiCl$_3$. The most appropriate ratio of the catalyst components can be determined by varying the mole ratio of Al(C$_2$H$_5$)$_3$/TiCl$_3$ according to the mole ratio of SbAl(C$_2$H$_5$)$_3$Cl$_3$/TiCl$_3$. The most appropriate ratio of the catalyst component also depends on the kind of organo-metallic complex containing antimony and aluminum which is employed. For example, in the case of utilizing SbAl(C$_2$H$_5$)$_6$Cl$_2$, the result obtained by performing the polymerization of propylene under the polymerization condition as described in Example 1 is shown in FIG. 2 wherein the rate of polymerization is plotted for the mole ratio of SbAl(C$_2$H$_5$)$_6$Cl$_2$/TiCl$_3$. The polymerization rate becomes maximum at 0.04 to 0.08 mole ratio of SbAl(C$_2$H$_5$)$_6$Cl$_2$/TiCl$_3$ when the mole ratio of Al(C$_2$H$_5$)$_3$/TiCl$_3$ is 4.0. The said maximum rate reaches more than 200 g. polymer/g. TiCl$_3$·hr. (at 60° C., at 3 kg./cm.$^2$).

As shown in Table 2 and FIG. 2, the most appropriate ratio of the catalyst components which gives the maximum polymerization rate depends on the kinds of organo-metallic complex containing antimony and aluminum. However, in case of using SbAlR$_m$X$_n$ ($m+n=8$), SbAlR$_m$'X$_n$' ($m'+n'=6$), Sb$_2$AlR$_{m''}$X$_{n''}$ ($m''+n''=9$) or SbAl$_2$R$_{m'''}$X$_{n'''}$ ($m'''+n'''=11$) according to the present invention, the optimum ratio of the catalyst components is kept in the range of 0.005 to 1 mole of said complex against 1 mole of titanium trichloride. It is obvious in Table 2 and FIG. 2 that, if an excess amount of said complex is used the polymerization catalyst is no longer effective and the polymerization is retarded. When the organoaluminum compound is used as much as 2 to 4 times mole against titanium trichloride, it is observed that the activity of the catalyst of the present invention is greatly promoted (as shown in Table 2). However too great an excess of organoaluminum compound does not affect the effect of the catalyst. Consequently, it is preferable to employ 1 to 6 mole of the organic aluminum compound against 1 mole of titanium trichloride. It may be possible to employ more than 6 mole of the compound but this is disadvantageous from the view point of promoting the effect of the present invention.

In the production of the polymer, polymerization may be conducted with or without a reaction medium. If a reaction medium is used, it is inactive to all catalyst components, and may be aliphatic, alicyclic or aromatic hydrocarbons such as, for example, butane, n-hexane, n-heptane, isooctane, benzene, toluene, xylene, cyclohexane, tetrahydronaphthalene and the like.

The ratio of such a solvent to the α-olefin can arbitrarily be determined according to the mode of polymerization. It is usually proper that, against 1 part by weight of α-olefin, less than 20 parts by weight of the solvent are used.

To produce a superior high molecular weight polymer, the polymerization temperature is between 15° to 120° C., and preferably between 40° to 80° C.

The partial pressure of the monomer may be selected within a broad range, but a partial pressure between atmospheric pressure and 30 atm. is suitable and a pressure between atmospheric pressure and 10 atm., is preferred.

The practical processes according to the present invention are explained in detail in the following examples, for the purpose of illustration only.

*Example 1*

40 mg. of SbAl(C$_2$H$_5$)$_6$Cl$_2$ prepared by said method hereinabove mentioned in the body (which was a colorless liquid having the following analytical values, found percent: Sb, 31.16; Al, 6.61; Cl, 19.09; C, 35.59; H, 7.57. Calculated percent: Sb, 30.90; Al, 6.85; Cl, 18.00; C, 36.58; H, 7.67), 1.14 g. of Al(C$_2$H$_5$)$_3$ and 0.386 g. of TiCl$_3$ sealed into different glass ampoules were charged into a 300 ml. autoclave equipped with a pressure gauge and then 2 stainless steel balls of 17 mm. in diameter were also enclosed. In this case, the mole ratio of SbAl(C$_2$H$_5$)$_6$Cl$_2$/TiCl$_3$ is 0.03.

After substituting several times the air in the autoclave with nitrogen, 150 cc. of n-hexane was added, 20 g. of pure propylene was charged under pressure at room temperature. Then, the autoclave was settled in a shaker in a water bath controlled at 60° C., maintained still for 5 minutes, and the polymerization was started by shaking the autoclave.

At the beginning, the pressure reached 7.0 kg./cm.$^2$ and, after 10 minutes, it was reduced to 2 kg./cm.$^2$. For completion of polymerization, stirring was continued for 20 hours. After a lapse of time, the autoclave was cooled and the residual pressure was removed, for which 5 ml. methanol was added to inactivate the residual catalyst. Then, the contents of the autoclave were transferred into 300 ml. methanol so that sufficient washing might be applied to remove the residual catalyst. The broken pieces of the glass ampoules were removed with the mixture solution of methanol-water, and finally 19.8 g. of white polymer was obtained. The polymerization rate converted at the standard conditions of 60° C. and 3 kg./cm.$^2$ was 170 g. polymer/g. TiCl$_3$·hr. The residue of n-heptane extraction (after 24 hours) was 89.3% of the polymer obtained. The intrinsic viscosity of this polymer was 3.67 in tetralin solution at 135° C.

According to the same process, changing only a mole ratio of SbAl(C$_2$H$_5$)$_6$Cl$_2$/TiCl$_3$ in the range of 0.003 to 0.9, the polymerization rate was obtained for each said ratio as shown in FIG. 2. n-Heptane extraction residue of these polymers obtained were more than 88.0%, except when said ratio was 0.003.

*Example 2*

2 stainless steel balls of 15 mm. in diameter and 150 ml. of purified n-hexane were added under nitrogen atmosphere into a stainless steel polymerization vessel of 400 ml., wherein 0.17 g. of Al(C$_2$H$_5$)$_3$, 0.038 g. of TiCl$_3$ and 4.1 mg. of SbAl(C$_2$H$_5$)$_4$Cl$_4$ prepared according to said process of the present invention (which was a white crystal of melting point 182 to 185° C. having the following analytical values, found percent: Sb, 28.80; Al, 6.40; Cl, 34.30; C, 23.47; H, 5.26. Calculated percent: Sb, 29.93; Al, 6.63; Cl, 34.87; C, 23.62; H, 4.95), were enclosed and maintained at 70° C. Then propylene was charged so as to keep its partial pressure at 3.0 kg./cm.$^2$ while the polymerization vessel was shaken and polymerization was carried out for 2 hours. The catalyst was decomposed immediately by charging 5 ml. methanol under pressure. Then, after cooling, the residual gas was removed and the contents of the autoclave were introduced into a large volume of methanol, which removed the residual catalyst. 18.3 g. of white powdery polymer were obtained by filtration and drying. The polymerization velocity for 2 hours corresponds to 240 g. polymer/g. TiCl$_3$·hr. The residue of n-heptane extraction was 92.1% of the polymer obtained. The intrinsic viscosity was 4.41.

*Example 3*

In the same way as in Example 2, except that, instead of SbAl(C$_2$H$_5$)$_4$Cl$_4$, 4.0 mg. of SbAl(C$_2$H$_5$)$_5$Cl$_3$ synthesized according to the method hereinabove mentioned in the body (which was a white crystal of 34 to 36° C. melting point, and had the following analytical values, found percent: Sb, 29.69; Al, 6.59; Cl, 26.90; C, 28.49; H, 5.96. Calculated percent: Sb, 30.41; Al, 6.74; Cl, 26.57; C, 29.97; H, 6.29), was employed, the polymerization was carried out at 70° C. at 3.0 kg./cm.$^2$ of propylene pressure for 2 hours and 22.8 g. of white powder polymer was obtained. The polymerization rate corresponds to 300 g. of polymer/g. $TiCl_3 \cdot hr$. The residue of n-heptane extraction was 89.8% of the polymer obtained. The intrinsic viscosity was 4.74.

*Example 4*

In the same conditions as in Example 2, except that, instead of $SbAl(C_2H_5)_4Cl_4$, 3.9 mg. of $SbAl(C_2H_5)_6Cl_2$ synthesized according to the method described in the body (which was colorless liquid and had the following analytical values, found percent: Sb, 31.16; Al, 6.61; Cl, 19.09; C, 35.59; H, 7.57. Calculated percent: Sb, 30.90; Al, 6.85; Cl, 18.00; C, 36.58; H, 7.67), was employed, the polymerization of propylene was carried out and 15.0 g. of white powdery solid was obtained. The residue of n-heptane extraction was 90.2% of the polymer obtained. The intrinsic viscosity was 5.01. In this case, the polymerization rate was 200 g. polymer/g. $TiCl_3 \cdot hr$.

*Example 5*

In the same conditions as in Example 2, except that, instead of $SbAl(C_2H_5)_4Cl_4$, 4.8 mg. of $SbAl(C_2H_5)_7I$ synthesized according to the method hereinabove mentioned in the body (which was colorless liquid and had the following analytical values, found percent: Sb. 24.38; Al, 5.54; I, 28.06; C, 34.50; H, 8.26. Calculated percent: Sb, 25.42; Al, 5.64; I, 26.49; C, 35.10; H, 7.36), was employed, the polymerization of propylene was carried out and 19.7 g. of white powdery polymer was obtained. The residue of n-heptane extraction was 87.4% of the polymer obtained. The intrinsic viscosity was 4.29. The polymerization rate was 260 g. polymer/g. $TiCl_3 \cdot hr$.

*Example 6*

In an autoclave equipped with an electromagnetic stirrer of 500 ml. capacity, 0.285 g. of $Al(C_2H_5)_3$, 0.097 g. of titanium trichloride and 0.024 g. of $SbAl(C_2H_5)_4Cl_4$ the same as in Example 2 were enclosed with 250 ml. n-heptane under dry nitrogen gas atmosphere. High-purity propylene monomer was charged under pressure into the autoclave in an oil bath kept at 70° C., so as to keep the monomer partial pressure at 1.3 kg./cm.². The autoclave was opened after four hours, the polymer obtained was washed with methanol, and then with water and dried, to obtain 29.1 g. of white powder polymer. The polymerization rate was 75 g./g. $TiCl_3 \cdot hr$., the residue of n-heptane extraction was 92.1% and the intrinsic viscosity was 3.52.

*Example 7*

The polymerization of propylene was carried out in the same way as in Example 6, except that 0.024 g. of $SbAl(C_2H_5)_6Cl_2$ the same as used in Example 4 was applied instead of $SbAl(C_2H_5)_4Cl_4$. 31.8 g. of white powdery polymer was obtained. The polymerization rate was 82 g./g. $TiCl_3 \cdot hr$., the residue of n-heptane extraction was 93.8% and the intrinsic viscosity was 3.73.

*Example 8*

In the same way as in Example 6, 92% propylene (main other component was propane) was polymerized at 70° C. under 3 kg./cm.² of partial pressure for 2 hours. After water washing and drying, 45 g. of white powdery polymer was obtained. The polymerization rate corresponds to 230 g. polymer/g. $TiCl_3 \cdot hr$. The residue of n-heptane extraction was 93.5% of the polymer obtained. The intrinsic viscosity was 3.40.

*Example 9*

$Sb(C_4H_9)_3$ was synthesized through Grignard reaction by the usual method, which was reacted with excess amount of $C_2H_5Cl$ at 100° C., to produce $(C_4H_9)_3(C_2H_5)SbCl$ When this product reacted with equimolar quantity of $Al(C_3H_7)_3$ in n-hexane, an organo-metallic complex, $SbAl(C_4H_9)_3(C_3H_7)_3(C_2H_5)Cl$, was quantitatively obtained as an insoluble colorless liquid product. Chemical analysis gave results quite agreeable with said chemical formula. (The analytical values were, found percent: Sb, 22.29; Al, 5.21; Cl, 6.79; C, 54.10; H, 10.23. Calculated percent: Sb, 23.69; Al, 5.25; Cl, 6.90; C, 53.75; H, 10.40.) According to the method in Example 1, 50 mg. of $SbAl(C_4H_9)_3(C_3H_7)_3(C_2H_5)Cl$ were used instead of $SbAl(C_2H_5)_6Cl_2$ and, 20 g. of propylene was polymerized at 40° C. The polymerization product was treated in the same way as in Example 1 and 19.8 g. of white powdery polymer was obtained. The residue of boiling n-heptane extraction was 87.9% of the polymer obtained and the intrinsic viscosity was 4.23.

*Example 10*

In the same way as in Example 1, except that 50 mg. of $SbAl(C_2H_5)_2(C_3H_7)_4ClBr$ synthesized according to the method hereinabove mentioned in the body (which was colorless liquid and had the following analytical values, found percent: Sb, 24.10; Al, 5.38; Cl, 7.01; Br, 15.72; C, 38.21; H, 7.53. Calculated percent: Sb, 24.62; Al, 5.46; Cl, 7.14; Br, 16.16; C, 38.85; H, 7.74), was employed instead of $SbAl(C_2H_5)_6Cl_2$, the polymerization was carried out at 40° C. and 18.9 g. of white powdery polymer was obtained. The residue of boiling n-heptane extraction was 87.2% of the polymer obtained and the intrinsic viscosity was 4.32.

*Example 11*

When the reaction of more than 2 mole of $Sb(C_2H_5)_3$ with 1 mole of $AlCl_3$ was carried out at 60° C. for 20 hours in n-hexane, insoluble light yellow-green crystals were precipitated and washed 10 times with purified hexane, so that $Sb_2Al(C_2H_5)_5Cl_4$ substantially insoluble in n-hexane was obtained (which had the following analytical values, found percent: Sb, 42.86; Al, 4.80; Cl, 26.95; C, 21.23; H, 4.47. Calculated percent: Sb, 43.67; Al, 4.84; Cl, 25.44; C, 21.52; H, 4.52), 0.010 mol of $Al(C_2H_5)_3$, 0.0025 mole of $TiCl_3$, and 0.0003 mole of $Sb_2Al(C_2H_5)_5Cl_4$ were respectively sealed into each glass ampoule. In the same process as in Example 1, the polymerization and the treatment of the polymerization product were carried out. The polymer obtained was a white powder and amounted to 18.7 g. This result corresponds to the standard polymerization rate of 170 g. polymer/g. $TiCl_3 \cdot hr$. The residue of n-heptane extraction was 89.3% and the intrinsic viscosity was 3.67.

*Example 12*

Under dry nitrogen atmosphere there were charged into a stainless steel autoclave of 400 ml. capacity, 150 ml. of purified n-hexane, 0.144 g. of $Al(C_2H_5)_2Cl$, 0.10 g. of $AlCl_3 \cdot 3TiCl$, 0.05 g. of $SbAl(C_2H_5)_4Cl_4$ the same as used in Example 2 and a stainless steel ball of 17 mm. in diameter. Then, 20 g. of propylene were charged under pressure and the polymerization was carried out at 70° C. while the autoclave was shaken. At the beginning, the pressure reached 7.5 kg./cm.² and, after half an hour, it decreased to 2 kg./cm.². After the polymerization was continued for 20 hours, the catalyst was decomposed by charging 5 ml. of methanol under pressure and, after removing the residual gas, the residue of the catalyst was removed by adding the polymerization product to 300 ml. methanol while stirring. 19.6 g. of white powdery polymer was obtained by repeating methanol washing. The residue of n-heptane extraction was 98.2% of the polymer obtained.

*Example 13*

$Sb(C_2H_5)_3AlCl_3$ was synthesized by the reaction between equimolar $Sb(C_2H_5)_3$ and $AlCl_3$. This complex was a brown-green liquid and had the following analytical values, found percent: Sb, 36.91; Al, 7.13; Cl. 31.06; C, 20.56; H, 4.25. Calculated percent: Sb, 35.58;

Al, 7.88; Cl, 31.08; C, 21.05; H, 4.41. The propylene polymerization was carried out by using said complex. According to the composition of the catalyst as shown in Table 2, Al(C₂H₅)₃, TiCl₃ and SbAl(C₂H₅)₃Cl₃ were charged under dry nitrogen atmosphere into an autoclave of 300 ml. capacity equipped with an electromagnetic stirrer and 150 ml. purified benzene were charged and then enclosed. After cooling the autoclave to −80° C., 20 g. of propylene was condensed into the autoclave. The autoclave was maintained at 60° C., while the polymerization was carried out for 20 hours. After 20 hours of operation, the autoclave was opened, the polymerization products were washed with methanol, and water, and dried. Then a white powdery polymer was obtained. The polymerization rate, the residue of n-heptane extraction and the intrinsic viscosity were as shown in Table 2.

*Example 14*

Sb(CH₃)₄I synthesized according to H. Landolt's method (Ann., vol. 78, pp. 96 (1851)) was suspended and dispersed in n-hexane and was reacted at room temperature by thereinto 20% n-hexane solution of Al(C₂H₅)₃ the amount of which was twice equimolar. Then, an n-hexane insoluble liquid layer was separated and washed repeatedly with n-hexane, to produce

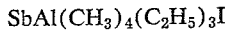

SbAl(CH₃)₄(C₂H₅)₃I (which was a colorless liquid and had the analytical values of: Found percent: Sb, 28.13; Al, 6.29; I, 31.02; C, 28.38; H, 6.43. Calculated percent: Sb, 28.79; Al, 6.38; I, 30.00; C, 28.39; H, 6.44).

12 mg. of SbAl(CH₃)₄(C₂H₅)₃I, 0.285 g. of Al(C₂H₅)₃ and 0.097 g. of TiCl₃ were charged under nitrogen gas atmosphere into a 500 cc. stainless steel autoclave equipped with an electromagnetic stirrer and 250 ml. of n-heptane was used as the polymerization medium.

Except for the above conditions, the polymerization was carried out at the same conditions as in Example 6. After the treatment of the polymerization product, 35.2 g. of white powdery polymer was obtained. The polymerization rate corresponds to 90 g. polymer/g. TiCl₃·hr. The residue of n-heptane extracted was 90.3% of polypropylene obtained. The intrinsic viscosity was 4.42.

*Example 15*

By the reaction of 0.1 mole of antimony trichloride with 0.6 mole of Al(C₂H₅)₃ at 60° C. in n-hexane, a n-hexane insoluble colorless liquid complex.

SbAl₂(C₂H₅)₉Cl₂ was synthesized as follows. As the reaction proceeded, Sb in powder state was precipitated. The product was filtered and the filtrate was washed well with n-hexane to remove the unreacted Al(C₂H₅)₃ completely. Then, the complex could be isolated. The complex had the following analytical values, found percent: Sb, 21.35; Al, 10:58; Cl, 13.28; C, 43.83; H, 9.42. Calculated percent: Sb, 23.96; Al, 10.62; Cl, 13.96; C, 42.54; H, 8.92.

0.285 g. of Al(C₂H₅)₃, 0.097 g. of TiCl₃ and 0.030 g. of SbAl₂(C₂H₅)₉Cl₂ and 250 ml. of n-heptane were enclosed under purified nitrogen atmosphere in a stainless steel autoclave of 500 ml. capacity, equipped with an electromagnetic stirrer. The autoclave was set in an oil bath kept at 70° C., and pure propylene was continuously fed into the autoclave while stirring, so as to keep the partial pressure at 3 kg./cm.². The supply of propylene was stopped after two hours operation and the autoclave was opened. The catalyst within the polymerization product was decomposed with 5 ml. of methanol. The product was boiled in 30% hydrochloric acid-methanol, washed with water and dried. 24.3 g. of white powdery polymer was obtained. The residue of boiling n-heptane extraction was 93.5% of the polymer obtained. The intrinsic viscosity was 3.40. The rate of polymerization was 125 g./g. TiCl·hr.

*Example 16*

34 mg. of SbAl₂(C₂H₅)₇(C₆H₁₃)₃Cl synthesized according to the method hereinabove mentioned in the body was a colorless liquid and had the following analytical values: Found percent: Sb, 18.48; Al, 8.10; Cl, 4.75; C, 57.29; H, 11.42. Calculated percent: Sb, 18.17; Al, 8.05; Cl, 5.29; C, 57.36; H, 11.13, 1.74 g. of Al(C₃T₇)₃, 0.097 g. of TiCl₃ and 250 ml. of purified xylene were charged under dry nitrogen atmosphere into an autoclave of 500 ml. capacity equipped with an electromagnetic stirrer and the autoclave was closed. After heating the autoclave to 80° C., the catalyst was prepared by stirring for 10 minutes. Then, keeping the autoclave at 90° C., 80% purity propylene (other components were in the most part propane including less than 0.5% butane) was polymerized continuously for 1 hour, at 10.0 atmospheres of the monomer partial pressure. After the elapse of a definite time, the catalyst was decomposed by adding 50 ml. of methanol to stop the polymerization. After cooling, 500 ml. of methanol was added and stirred. The polymerization product was filtered and boiled with 30% hydrochloric acidmethanol. 25.2 g. of white powder polymer was obtained, which corresponded to the polymerization rate of 260 g. polymer/g. TiCl₃·hr. The residue of n-heptane extraction was 88.4% of the polymer obtained. The intrinsic viscosity was 2.51.

*Example 17*

150 ml. of purified n-hexane, 1.98 g. of Al(C₄H₉)₃, 0.385 g. of TiCl₃ and 0.1 g. of SbAl(C₂H₅)₆Cl₂ were charged in turn in a 300 ml. autoclave equipped with an electromagnetic stirrer and closed. After the autoclave was cooled to −40° C., 28.5 g. of butene-1 of 99.4% purity were condensed into the autoclave. After, heating the autoclave to 90° C., the polymerization was started by stirring.

The polymerization proceeded smoothly. The gas pressure reached 8.0 kg./cm.² at the beginning, but was lowered to less than 1.5 kg./cm.² three hours later. After the polymerization was continued for 20 hours, the catalyst was decomposed by adding 5 ml. of methanol, the polymerization product was treated with 500 ml. of methanol to remove the residue of the catalyst, and, through repeated filtration and washing, 26 g. of white polymer was obtained. The insoluble part in boiling ether was 85% of the polymer obtained. The intrinsic viscosity in tetralin solution at 135° C. was 2.47.

*Example 18*

In the same process as in Example 1, 30 g. of styrene instead of high-purity propylene were used and the polymerization was carried out for 3 hours. After the purification with methanol, 25 g. of white powdery polymer was obtained.

The polymer obtained proved to have high crystallinity by X-ray analysis.

*Example 19*

In the same way as in Example 1, except that 40 g. of 4-methyl pentene-1 (98.5% in purity) was employed instead of high-purity propylene, the polymerization was carried out for 16 hours. After purification with methanol, 39 g. of white fine powdery polymer was obtained. The insoluble part in boiling ether was 90% of the polymer obtained.

*Example 20*

16 l. of purified n-hexane, 10.94 g. of Al(C₂H₅)₃, 4.92 g. of TiCl₃ and 1.31 g. of SbAl(C₂H₅)₄Cl₄ were charged into a glass-lined polymerization vessel of 25 l. capacity. The vessel was heated to 70° C., stirred for 10 minutes, and the polymerization was carried out under propylene partial pressure of 5 kg./cm.². After continuing the polymerization for 4 hours, 50 ml. of methanol was added to stop the polymerization. The residual gas was removed, the vessel cooled, and the residue of the catalyst was dissolved in 20 l. of added methanol. The filtration and washing were repeated, and 3600 g. of polymer was obtained. This corresponded to the standard polymerization rate of 180 g. polymer/g. $TiCl_3 \cdot hr$. The residue of n-heptane extraction reached 89.3% of the polymer obtained. The intrinsic viscosity was 3.85. This polymer was pelletized at 270° C. and extruded into film. The film obtained became sufficiently transparent and uniform in quality by rapid cooling. The stretched film gives very little waxy feeling.

What we claim is:

1. A method of producing high crystalline poly-α-olefins which comprises polymerizing α-olefins having 3 to 8 carbon atoms with a catalyst obtained by the reaction of titanium trichloride, an alkyl aluminum compound of the formula: $RR'AlR''$ wherein R and R' represent respectively alkyl groups and R'' represents one member selected from the group consisting of alkyl groups and halogens; and an organo-metallic complex having the general formula $Sb AlR_{m'}X_{n'}$ wherein R is an alkyl group having 1 to 8 carbon atoms; X is a halogen atom selected from the group consisting of Br, Cl, and I; and $m'$ and $n'$ are integers, the sum of which is equal to 6; said organo-metallic complex being selected from the group consisting of $SbAl(C_2H_5)_3Cl_3$ and $SbAl(C_2H_5)_4Cl_2$, the ratio of said titanium trichloride, alkyl aluminum compound and organo-metallic complex being 1:1–6: 0.005–1.

2. A method of producing high crystalline poly-α-olefins which comprises polymerizing α-olefins having 3 to 8 carbon atoms with a catalyst obtained by the reaction of titanium trichloride, an alkyl aluminum compound of the formula: $RR'AlR''$ wherein R and R' represent respectively alkyl groups and R'' represents one member selected from the group consisting of alkyl groups and halogens; and an organo-metallic complex having the general formula $Sb_2AlR_{m''}X_{n''}$ wherein R is an alkyl group having 1 to 8 carbon atoms; X is a halogen atom selected from the group consisting of Br, Cl, and I; and $m''$ and $n''$ are integers the sum of which is equal to 9; said organo-metallic complex being selected from the group consisting of $$Sb_2Al(C_2H_5)_5Cl_4 \text{ and } Sb_2Al(C_3H_7)_5Cl_4$$

the ratio of said titanium trichloride, alkyl aluminum compound and organo-metallic complex being 1:1–6:0.005–1.

3. A method of producing high crystalline poly-α-olefins which comprises polymerizing α-olefins having 3 to 8 carbon atoms with a catalyst obtained by the reaction of titanium trichloride, an alkyl aluminum compound of the formula: $RR'AlR''$ wherein R and R' represent respectively alkyl groups and R'' represents a member selected from the group consisting of alkyl groups and halogens; and an organo-metallic complex having the general formula $SbAl_2R_{m'''}X_{n'''}$ wherein R is an alkyl group having 1 to 8 carbon atoms; X is a halogen atom selected from the group consisting of Br, Cl, and I; and $m'''$ and $n'''$ are integers of 1 to 10 the sum of which is equal to 11, said organo-metallic complex being selected from the group consisting of $SbAl_2(C_2H_5)_9Cl_2$, $$SbAl_2(C_2H_5)_{10}Cl, \text{ and } SbAl_2(C_2H_5)_7(C_6H_{13})_3Cl$$

the ratio of said titanium trichloride, alkyl aluminum compound and organo-metallic complex being 1:1–6: 0.005–1.

4. A method for producing high crystalline polypropylene which comprises polymerizing propylene with a catalyst prepared by the reaction of 1 mole of titanium trichloride, 4 moles of aluminum triethyl and 0.11 mole of $SbAl(C_2H_5)_6Cl_2$.

5. A method for producing high crystalline polypropylene which comprises polymerizing propylene with a catalyst prepared by the reaction of 1 mole of $3TiCl_3 \cdot AlCl_3$, 2 moles of $Al(C_2H_5)_2Cl$ and 0.25 mole of $SbAl(C_2H_5)_4Cl_4$.

References Cited

UNITED STATES PATENTS

| | | | |
|---|---|---|---|
| 3,081,287 | 3/1963 | Coover et al. | 252—429 |
| 3,118,865 | 1/1964 | Bruce et al. | 252—429 |
| 3,207,734 | 9/1965 | Tsundoa et al. | 260—94.4 |

FOREIGN PATENTS

| | | |
|---|---|---|
| 233,098 | 3/1961 | Australia. |
| 608,467 | 9/1961 | Belgium. |

JOSEPH L. SCHOFER, *Primary Examiner.*

JAMES A. SEIDLECK, HARRY WONG, *Examiners.*